(12) United States Patent
Kaneko

(10) Patent No.: US 9,176,686 B2
(45) Date of Patent: Nov. 3, 2015

(54) MANAGEMENT SYSTEM, MANAGEMENT SERVER, IMAGE FORMING APPARATUS, AND MANAGEMENT METHOD

(75) Inventor: Tsuyoshi Kaneko, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 13/338,150

(22) Filed: Dec. 27, 2011

(65) Prior Publication Data

US 2012/0182572 A1 Jul. 19, 2012

(30) Foreign Application Priority Data

Jan. 14, 2011 (JP) ................... 2011-005633

(51) Int. Cl.
  *G06F 3/12* (2006.01)
  *H04N 1/00* (2006.01)
  *H04N 1/32* (2006.01)
(52) U.S. Cl.
  CPC .............. *G06F 3/121* (2013.01); *G06F 3/1203* (2013.01); *G06F 3/123* (2013.01); *G06F 3/1234* (2013.01); *G06F 3/1287* (2013.01); *H04N 1/00244* (2013.01); *H04N 1/00344* (2013.01); *H04N 1/32625* (2013.01); *H04N 1/32662* (2013.01); *H04N 1/32694* (2013.01); *G06F 2206/1506* (2013.01); *H04N 2201/001* (2013.01); *H04N 2201/0039* (2013.01); *H04N 2201/0094* (2013.01)
(58) Field of Classification Search
  CPC ............... H04N 1/32694; H04N 2201/001; H04N 2201/0039; H04N 2201/0094; G06F 3/121; G06F 3/1203; G06F 3/123
  USPC ................................. 358/1.13–1.15
  See application file for complete search history.

(56) References Cited

U.S. PATENT DOCUMENTS

| 8,390,855 | B2* | 3/2013 | Kano | 358/1.15 |
|---|---|---|---|---|
| 2005/0134893 | A1* | 6/2005 | Han | 358/1.14 |
| 2006/0227363 | A1* | 10/2006 | Ogura | 358/1.15 |
| 2008/0074698 | A1* | 3/2008 | Richter et al. | 358/1.15 |
| 2009/0051962 | A1* | 2/2009 | Asai et al. | 358/1.15 |
| 2010/0053674 | A1* | 3/2010 | Kano | 358/1.15 |
| 2010/0079793 | A1* | 4/2010 | Nishikawa | 358/1.15 |
| 2010/0079803 | A1* | 4/2010 | Takeya | 358/1.15 |
| 2011/0026080 | A1* | 2/2011 | Onishi | 358/1.15 |
| 2011/0304884 | A1* | 12/2011 | Kaneko | 358/1.15 |

FOREIGN PATENT DOCUMENTS

| JP | 2008-210103 A | 9/2008 |
|---|---|---|
| JP | 2010-142975 A | 7/2010 |

\* cited by examiner

*Primary Examiner* — Marivelisse Santiago Cordero
*Assistant Examiner* — Kevin Ky
(74) *Attorney, Agent, or Firm* — Canon USA, Inc., IP Division

(57) ABSTRACT

An image forming apparatus transmits, when a function which cooperates with a function providing apparatus is added, information on the added function to a management server, and changes a failure monitoring setting according to the returned monitoring condition. If a failure occurs, the image forming apparatus generates, if the failure is attributable to the function providing apparatus, failure information indicating that the failure is attributable to the function providing apparatus, and otherwise, the image forming apparatus generates failure information on the failure to transmit to the management server. Upon receiving the information on the added function from the image forming apparatus, the management server returns the monitoring condition corresponding to the added function to arrange for maintenance of the image forming apparatus. If the failure is attributable to the function providing apparatus, the management server does not arrange for maintenance of the image forming apparatus.

14 Claims, 14 Drawing Sheets

FIG. 4

```
<Event.Conf>
  <FileVersion>X.X.0 <FileVersion>
  <CreateDate>Thu October 7 19:11:00 JST 2010</CreateDate>
  <Error>
    <Code Unit="10">
      <Start>50000</Start>
      <End>59999</End>
    </Code>
    <Code Unit="16">
      <Start>04000000</Start>
      <End>04FFFFFF</End>
    </Code>
  </Error>
  <Alarm>
    <Code Unit="16"> XX040008</Code>
    <Code Unit="16"> XX100001</Code>
    <Code Unit="16"> XX100002</Code>
    <Code Unit="16"> XX100003</Code>
    <Code Unit="16"> XX100004</Code>
    <Code Unit="16"> XX010001</Code>
    <Code Unit="16"> XX010002</Code>
    <Code Unit="16"> XX010003</Code>
    <Code Unit="16"> XX010004</Code>
    <Code Unit="16"> XX310001</Code>
    <Code Unit="16"> XX040010</Code>
  </Alarm>
  <Jam>
    <Code Unit="16">
      <Start>04</Start>
    </Code>
    <Code Unit="10">
      <Start>40030</Start>
    </Code>
    <Code Unit="10">
      <Start>40900</Start>
      <End>40933</End>
    </Code>
  </Jam>
</Event.Conf>
```

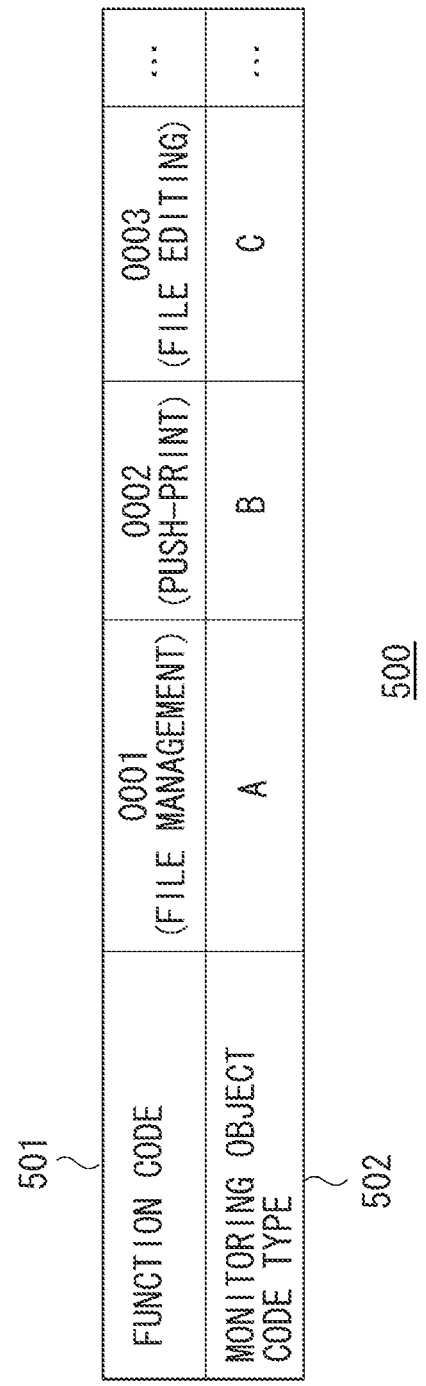

FIG. 6

| FAILURE CODE | DETAILS OF FAILURE |
|---|---|
| 720003 | RENDERING ERROR |
| x20003 | RENDERING ERROR (ABNORMALITY IN ACQUIRED PDL) |
| 04010001 (0000) | SCAN ERROR |
| 0xx10001 (0001) | SCAN DATA TRANSMISSION ERROR |
| ... | ... |

FIG. 7

| SALES COMPANY ID | CUSTOMER ID | IMAGE FORMING APPARATUS ID | NAME OF MAINTENANCE PERSONNEL | ADDRESS |
|---|---|---|---|---|
| AAA01 | CUST0001 | DEV0000001 | TARO KOSUGI | xxx.taro@xxxon.co.jp |
| AAA01 | CUST0001 | DEV0000002 | TARO KOSUGI | xxx.taro@xxxon.co.jp |
| AAA01 | CUST0002 | DEV0000011 | HANAKO KOSUGI | xxx.hanako@xxxon.co.jp |
| ... | ... | ... | ... | ... |
| — | CUST0001 | DEV0000001 | JIRO MARUKO | ziro.@cloudservice.co.jp |

FIG. 8

| SERVICE / MODEL | FILE MANAGEMENT | PUSH-PRINT | WORKFLOW COMPOSER | ... |
|---|---|---|---|---|
| iR 10x | × | × | × | ... |
| iR xxx | ○ | ○ | × | ... |
| iR-Adv Cxxx | ○ | ○ | ○ | ... |
| ... | ... | ... | ... | ... |

| SERVICE / FIRMWARE | FILE MANAGEMENT | PUSH-PRINT | WORKFLOW COMPOSER | ... |
|---|---|---|---|---|
| MAIN | 1.80 | 1.80 | 2.10 | ... |
| PRINT | – | 1.00 | – | ... |
| PDL_BOALD | 1.04 | 1.04 | – | ... |
| ... | ... | ... | ... | ... |

MANAGEMENT SYSTEM, MANAGEMENT SERVER, IMAGE FORMING APPARATUS, AND MANAGEMENT METHOD

BACKGROUND OF THE INVENTION

1. Field of the Invention

The present invention relates to a technique for remotely managing an image forming apparatus in an environment in which functions provided via a network can be used in the image forming apparatus.

2. Description of the Related Art

An image forming apparatus used in an office, such as a copying machine or a printer, includes various functions. For example, the image forming apparatus includes a scanning function, a facsimile function, and a transmission function in which an address to be transmitted to is designated. Further, the image forming apparatus includes a function for converting scan data to a portable document format (PDF), and a function for converting such scan data to a desired page description language (PDL) when performing printing.

Conventionally, there is a system which detects and notifies a management server on the network of failures that have occurred when the functions included in the image forming apparatus are used (refer to Japanese Patent Application Laid-Open No. 2008-210103 and Japanese Patent Application Laid-Open No. 2010-142975).

The management server in the system stores, counts, and notifies a user of information that the management server has been notified of. Further, according to Japanese Patent Application Laid-Open No. 2008-210103, the management server in a management system controls instructions to be issued to the image forming apparatus based on status information (i.e., device information, failure information, and counter information) of the image forming apparatus. In such a case, management information includes network information and the device information of the image forming apparatus, and operation information includes the failure information and the counter information of the image forming apparatus.

Furthermore, in recent years, there are cases where at least a portion of the functions to be included in the image forming apparatus is assigned to a server on the Internet. In such a case, the image forming apparatus accesses the server via a communication line and uses the functions assigned to the server, so that the image forming apparatus is provided with the functions not included therein. For example, if the function for converting the scan data to the PDF format is provided on the network, it is assumed that the process to be described below is performed.

The image forming apparatus in the office performs scanning and transmits the data to the server on the network via the communication line. The server on the network then coverts the data to a PDF file and returns the PDF file to the image forming apparatus in the office. The image forming apparatus thus acquires the scan data in the PDF format.

If such a system is introduced, the image forming apparatus can freely use the functions provided by the server and convenience thereof is greatly improved. Further, it becomes unnecessary to install in the office an image forming apparatus including specific functions to be shared by a plurality of users. Furthermore, problems such as insufficient resources (e.g., a hard disk drive (HDD) and a memory) can be solved.

The functions provided by the server as described above may not be usable by previous models of the image forming apparatus. Such previous models may become capable of using the functions provided by the server by updating firmware or improving the functions using a universal serial bus (USB) memory.

However, the image forming apparatus in the conventional systems discussed in Japanese Patent Application Laid-Open No. 2008-210103 and Japanese Patent Application Laid-Open No. 2010-142975 notifies the management server of the failure information according to a predetermined rule. As a result, if a function which cooperates with the function on the network is newly added to the image forming apparatus, the image forming apparatus cannot appropriately notify the management server of failures in the newly added function.

For example, if a failure occurs when the image forming apparatus is to use the function provided on the network, the image forming apparatus cannot recognize whether the failure has occurred in the image forming apparatus itself or in an external device such as the server which provides the functions thereto. If the image forming apparatus then notifies the management server of the occurrence of an abnormality in such a state, the management server receiving the notification cannot determine whether the abnormality has occurred in the image forming apparatus or in the external device. Further, the management server may treat the problem as an abnormality occurring in the image forming apparatus.

In a conventional system, the management server issues, when there is a failure in an image forming apparatus managed thereby, a notification for arranging a service personnel to be dispatched, for restoring the image forming apparatus. Upon receiving the above-described notification from the image forming apparatus, the management server may proceed to arrange for the service personnel to be dispatched to an installation location of the image forming apparatus in which there is no abnormality. In such a case, unnecessary dispatching cost may be generated.

Further, in the case where a problem has occurred in the external device on the network, the external device can be promptly restored if the management server can notify a maintenance personnel for the external device at the time of the management server recognizing the problem.

There is thus a demand for the image forming apparatus to become capable of appropriately issuing a notification to the management server even if a function which cooperates with the function on the network is newly added to the image forming apparatus. Further, there is a demand for the management server to identify where a failure has occurred, so that an appropriate service personnel can be flexibly dispatched.

SUMMARY OF THE INVENTION

The present invention is directed to a system in which an image forming apparatus can appropriately issue a notification to a management server, even if a function which cooperates with the function on the network is newly added to the image forming apparatus. Further, the present invention is directed to a system in which the management server can identify where a failure has occurred, so that an appropriate service personnel can be flexibly dispatched.

According to an aspect of the present invention, a management system includes an image forming apparatus and a management server that communicates with the image forming apparatus via a network.

The image forming apparatus includes a monitoring unit configured to monitor a failure, a detection unit configured to detect an addition of a function that uses a service provided by a function providing apparatus by communicating with the function providing apparatus via the network, an added function transmission unit configured to transmit to the management server information on an added function detected by the detection unit, a monitoring condition receiving unit configured to receive a monitoring condition corresponding to the added function returned from the management server according to transmission by the added function transmission unit, a setting unit configured to set the monitoring condition received by the monitoring condition receiving unit to be added to a monitoring condition of the monitoring unit, a generation unit configured to generate, if the monitoring unit has detected an occurrence of a failure corresponding to the monitoring condition and the failure is attributable to the function providing apparatus, failure information by which it can be identified that the detected failure is attributable to the function providing apparatus, and to generate, if it is not identified that the failure is attributable to the function providing apparatus, failure information on the failure detected by the monitoring unit, and a transmission unit configured to transmit to the management server the failure information generated by the generation unit. The management server includes an added function receiving unit configured to receive information on an added function from the image forming apparatus, a monitoring condition transmission unit configured to transmit to the image forming apparatus a monitoring condition corresponding to the information on the added function received by the added function receiving unit, a receiving unit configured to receive failure information from the image forming apparatus, and a notification unit configured to issue a notification for arranging maintenance of the image forming apparatus according to the failure information received from the image forming apparatus, wherein the management server can identify that the failure is attributable to the function providing apparatus based on the received failure information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an example of a list of failure codes to be monitored.

FIG. 5 illustrates an example of a correspondence table between a type of the list of failure codes to be monitored and a function provided by a function providing apparatus.

FIG. 6 illustrates an example of a failure information table.

FIG. 7 illustrates an example of a notifying address information table.

FIG. 8 illustrates an example of a correspondence table between model information of the image forming apparatus and a function provided by the function providing apparatus.

FIG. 9 illustrates an example of a correspondence table between a function provided by the function providing apparatus and version information of firmware in the image forming apparatus capable of using the function.

DESCRIPTION OF THE EMBODIMENTS

Various exemplary embodiments, features, and aspects of the invention will be described in detail below with reference to the drawings.

Figure 1:
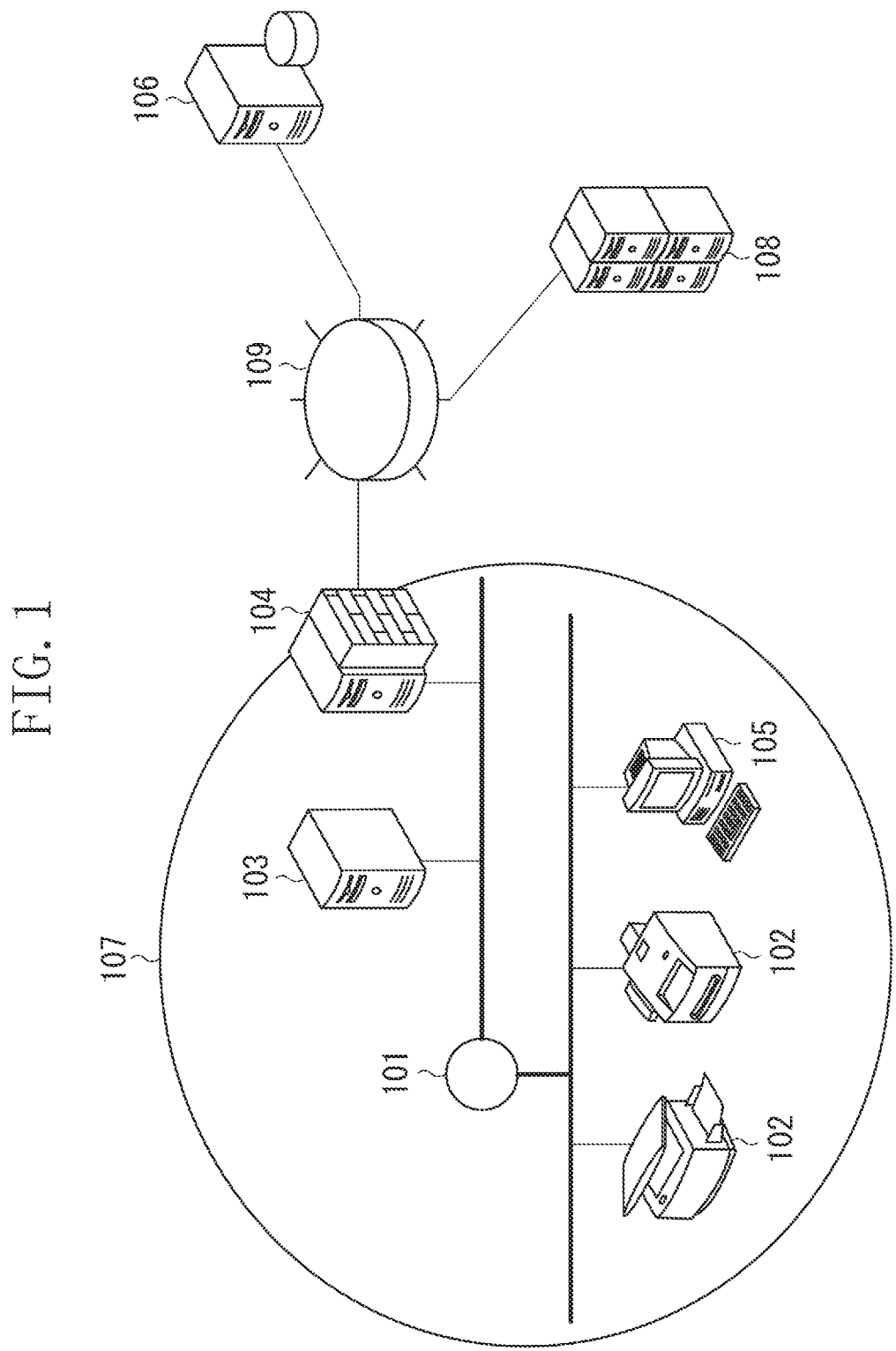
FIG. 1 illustrates a configuration example of a management system according to an exemplary embodiment of the present invention.

FIG. 1 illustrates a configuration example of a management system according to an exemplary embodiment of the present invention. More specifically, FIG. 1 illustrates a connection between an image forming apparatus main body and a management server via the Internet.

Referring to FIG. 1, an image forming apparatus 102, a proxy server 103, a firewall (FW) 104, and a personal computer (PC) 105 are connected to each other via a local area network (LAN) 101. The image forming apparatus 102 may include functions such as facsimile and copy functions (not illustrated). The FW 104 is installed to improve the security level. The PC 105 is used by a general user in the office.

A management server 106 manages device information and performs processes for maintaining the image forming apparatus 102. A local environment 107 protected by the FW 104 is an example of a customer environment managed by the management server 106. As illustrated in FIG. 1, it is assumed that there is a plurality of image forming apparatuses 102 in the customer environment. When a failure occurs in such image forming apparatuses 102, the management server 106 is notified of the occurrence of the failure, and the management server 106 arranges for a service personnel to be dispatched. The image forming apparatus 102 transmits to the management server 106 via the Internet 109 the device information such as management information and operation information (e.g., a counter value, an operation status log, and failure information) thereof. The image forming apparatus 102 transmits the device information when the failure has occurred or according to a communication schedule. The management server 106 is connected via the Internet 109 to a plurality of customer environments (not illustrated) and remotely controls the image forming apparatuses in such environments. Further, the management information includes information for identifying the apparatus (e.g., a serial number, model information, an Internet protocol (IP) address, and a media access control (MAC) address), and firmware version information.

A function providing apparatus 108 which provides various functions to the image forming apparatus includes the functions that can be used by the image forming apparatus 102 via the Internet 109. Examples of the functions usable by the image forming apparatus 102 by cooperating with the function providing apparatus 108 include a large-capacity storage function, a form creation application, a data format conversion application, and a workflow creation application. If the image forming apparatus 102 is to use the functions included in the function providing apparatus 108, the image forming apparatus 102 communicates with the function providing apparatus 108 via the Internet 109, and causes the function providing apparatus 108 to perform a predetermined process. The image forming apparatus 102 then receives the processing result from the function providing apparatus 108, and provides the function to the user.

According to the present exemplary embodiment, a plurality of customer environments 107, the management server 106, and the function providing apparatus 108 are connected to each other via the Internet 109 in the management system. Further, according to the present exemplary embodiment, protocols such as hypertext transfer protocol (HTTP) and HTTP over secure socket layer (HTTPS) are used as a communication protocol. However, the communication protocol is not limited to the above. In the example illustrated in FIG. 1, the image forming apparatus 102 uses HTTPS to transmit the data to the management server 106 via the proxy server 103 and the FW 104.

Figure 2:
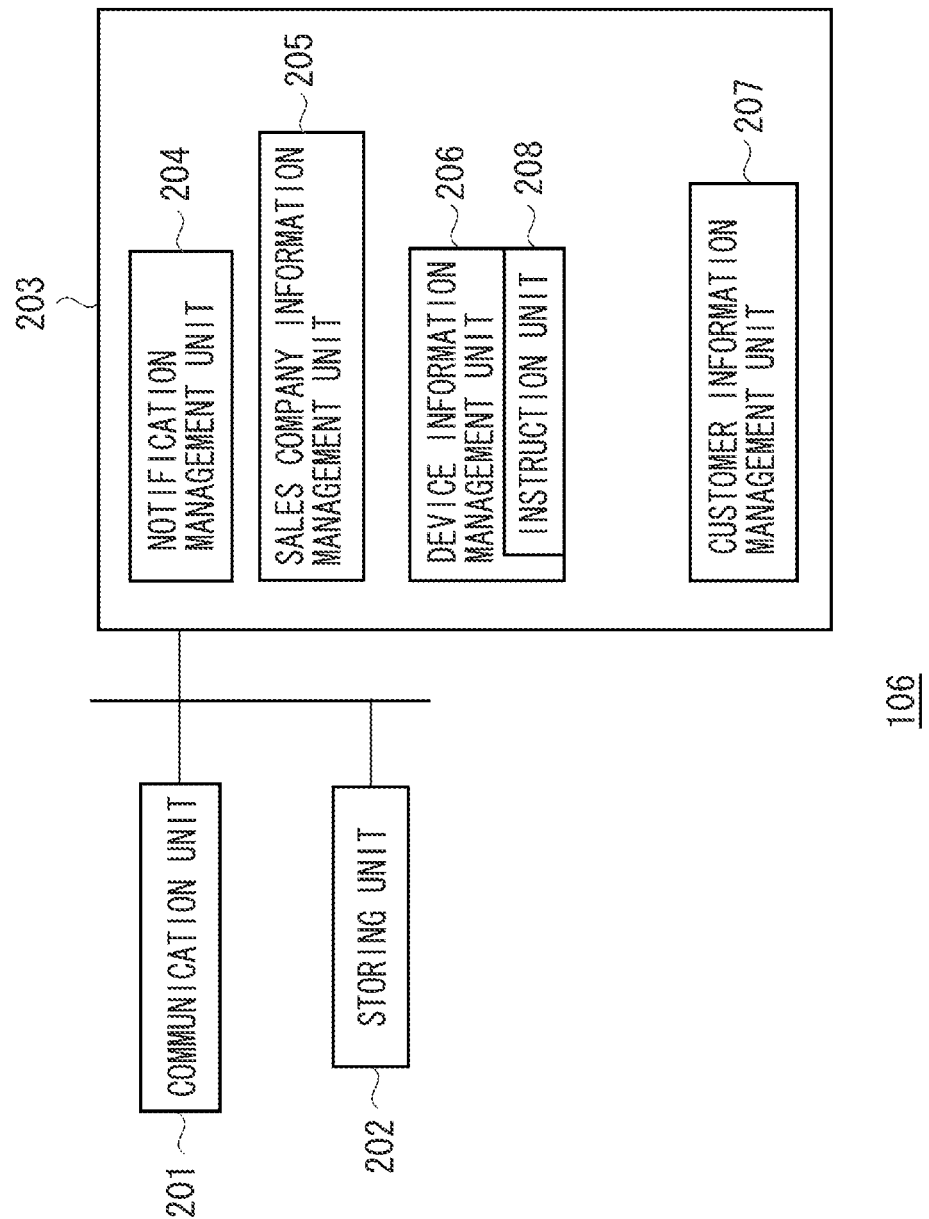
FIG. 2 illustrates an internal configuration example of a management server.

FIG. 2 illustrates the internal configuration example of the management server 106.

Referring to FIG. 2, the management server 106 includes a communication unit 201, a storing unit 202 including an HDD, a read-only memory (ROM), and a random access memory (RAM), and a control unit 203 such as a central processing unit (CPU).

The communication unit 201 has a function for communicating with the image forming apparatus 102. The communication unit 201 receives the device information from the image forming apparatus 102 and transmits necessary instruction information and setting information to the image forming apparatus 102. The counter value indicates a number of sheets printed by the image forming apparatus or a number of times a component is used in the image forming apparatus.

The storing unit 202 stores the device information, sales company information, customer information, and programs. The control unit 203 executes the programs stored in the storing unit 202 to implement processes performed by each logic module. The logic modules include a notification management unit 204, a sales company information management unit 205, a device information management unit 206, and a customer information management unit 207. The control unit 203 thus realizes monitoring and management of information necessary for performing maintenance of the image forming apparatus 102, which will be described below.

The notification management unit 204 generates the notification information necessary for monitoring the image forming apparatus, designates a notification address, generates notification data, and performs notification control via the communication unit 201. The notification includes a maintenance request notification for arranging the service personnel to be dispatched for performing maintenance of the image forming apparatus 102. The notification also includes a replenishment request notification for replenishing consumables (e.g., a cartridge or consumable parts) in the customer environment, and a notification to a personnel in charge of maintenance for the function providing apparatus 108.

The sales company information management unit 205 manages the information on the sales company supporting the image forming apparatus 102 installed in the customer environment (i.e., the sales company information stored in the storing unit 202). The device information management unit 206 manages the information on the image forming apparatus 102 to be managed (i.e., the device information stored in the storing unit 202). The device information includes the identification information and status information of the image forming apparatus, maintenance history, and administrator information and consumables management information of the image forming apparatus.

The device information management unit 206 includes an instruction unit 208. The instruction unit 208 has an instruction function for the management server 106 to issue commands and instructions to the image forming apparatus 102. Examples of the commands and instructions are "setting change" and "restart" issued with respect to the image forming apparatus 102.

The customer information management unit 207 manages the information on the customer environment in which the image forming apparatus 102 is installed (i.e., the customer information) stored in the storing unit 202. The customer information also includes the information on a maintenance contract with the sales company, and information on a function providing apparatus which provides the functions to the image forming apparatus installed in the customer environment.

Figure 3:
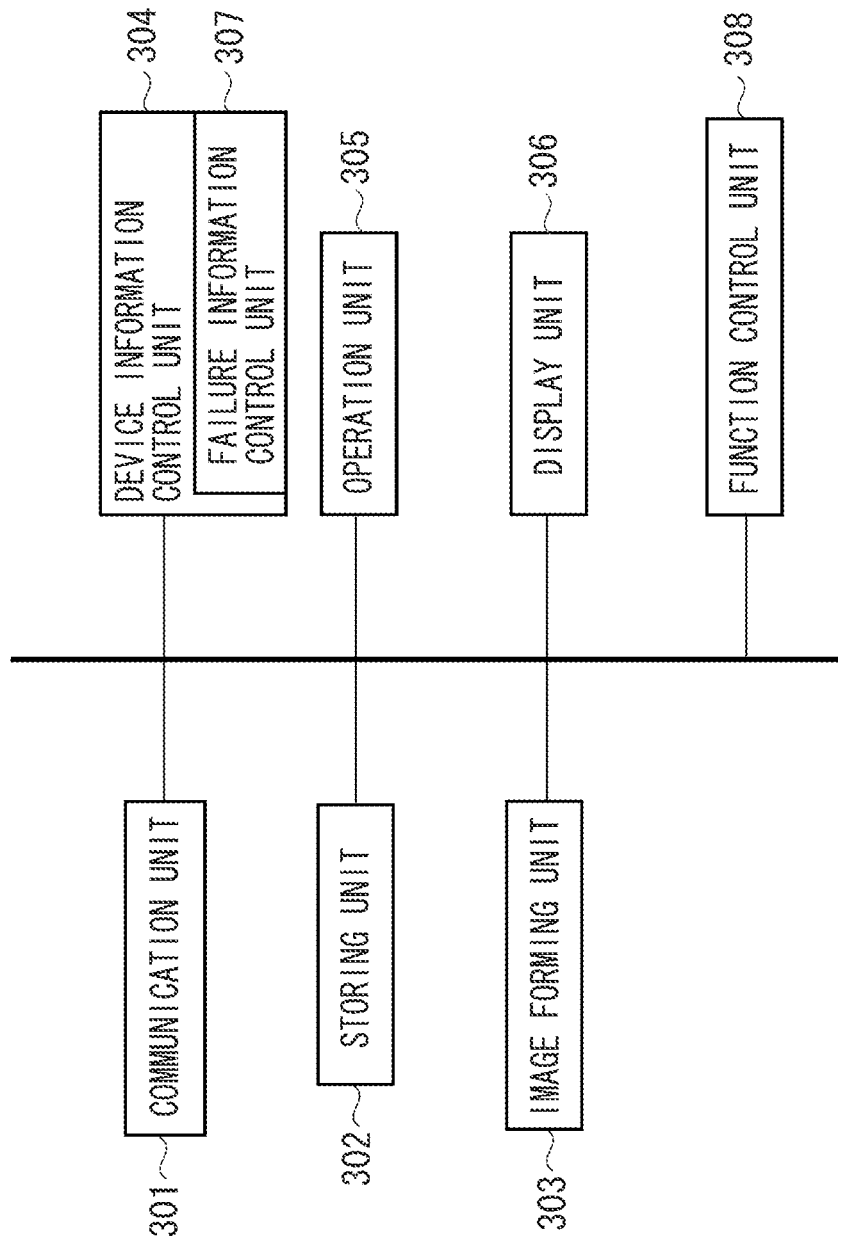
FIG. 3 illustrates an internal configuration example of an image forming apparatus.

FIG. 3 illustrates the internal configuration example of the image forming apparatus 102.

Referring to FIG. 3, the image forming apparatus 102 includes a communication unit 301, a storing unit 302, an image forming unit 303 having an image forming engine, a device information control unit 304 such as a CPU, an operation unit 305, a display unit 306, and a function control unit 308. The storing unit 302 includes an HDD, a ROM, and a RAM. Further, the device information control unit 304 includes a failure information control unit 307.

The communication unit 301 is used in communicating with external devices, such as transmitting the device information on the image forming apparatus 102 to the management server 106. Further, the communication unit 301 receives instructions transmitted from the management server 106. Furthermore, the communication unit 301 communicates with the function providing apparatus 108 to request for and to use a desired function. The communication unit 301 transmits and receives the instructions and the requests using simple mail transfer protocol (SMTP) or HTTP/HTTPS.

The storing unit 302 stores the information such as the device information, the information on the management server 106, and the information on the function providing apparatus 108. Further, the storing unit 302 stores an operation history of the image forming apparatus 102, and the failure information based on various abnormalities and failures that have occurred in the image forming apparatus 102. The information on the management server 106 includes the network information necessary for performing communication, such as the IP address of the management server 106. Further, the information on the function providing apparatus 108 includes the network information and the information on the functions to be provided.

The image forming unit 303 interprets print data and outputs a printed product. The device information control unit 304 executes programs stored in the storing unit 302 and realizes various processes. The device information control unit 304 uses the storing unit 302 to perform print control and manage abnormal statuses of the image forming apparatus 102, and to manage the counter information and the notification information. Further, the device information control unit 304 performs control of color adjustment, print mode, and other function settings. Furthermore, the device information control unit 304 executes the programs stored in the storing unit 302 and realizes the processes performed by the failure information control unit 307, i.e., a logic module.

The failure information control unit 307 generates, when a failure corresponding to a monitoring condition occurs in the image forming apparatus 102, the failure information to be transmitted to the management server 106. The monitoring condition is specified as preset failure codes to be monitored, and as the failure codes described in a list of failure codes to be monitored 401 as illustrated in FIG. 4 to be described below. The failure codes that are to be the monitoring condition are stored in the storing unit 302 and managed by the failure information control unit 307.

The operation unit 305 is an interface for allowing the user to issue operation instructions to the image forming apparatus 102, such as a print instruction. The display unit 306 displays appropriate information to the user. The display information displayed on the display unit 306 includes the status information and the setting information of the image forming apparatus 102.

The function control unit 308 executes the programs stored in the storing unit 302 and realizes various processes. The function control unit 308 collectively controls the processes of the image forming apparatus 102, such as a communication process and a printing process. Further, the function control unit 308 receives input from the operation unit 305 and controls the processes in the image forming apparatus 102 such as a setting change. The function control unit 308 controls the various functions performed in the image forming apparatus 102.

The functions controlled by the function control unit 308 are applications performed on the image forming apparatus 102, which provide various services by cooperating with the functions originally included in the image forming apparatus 102. The services provided by the applications include a service that uses the functions provided by the function providing apparatus 108 by communicating with the function providing apparatus 108 via the communication unit 301.

FIG. 4 illustrates an example of the list of failure codes to be monitored 401 stored in the management server 106 and the image forming apparatus 102.

Referring to FIG. 4, the list of failure codes to be monitored 401 is stored as a setting file of a file format in the storing unit 202 in the management server 106 and the storing unit 302 in the image forming apparatus 102. The list of failure codes to be monitored 401 exists for each function code type (i.e., types A, B, and C, etc.) illustrated in FIG. 5 to be described below.

The image forming apparatus 102 can identify the failure information to be transmitted to the management server 106 among the failures that have occurred therein, using the list of failure codes to be monitored 401.

In the list of failure codes to be monitored 401, "<Code Unit="10">...</Code>" indicates that a code surrounded by such tags is described as a decimal number. Further, "<Code Unit="16">...</Code>" indicates that a code surrounded by such tags is described as a hexadecimal number.

For example, a section 402 indicates error codes to be monitored. More specifically, the section 402 indicates that if failures corresponding to the error codes 50000 to 59999 in decimal notation and 04000000 to 04FFFFFF in hexadecimal notation have occurred, the image forming apparatus 102 notifies the management server 106.

Further, a section 403 indicates warning codes to be monitored. The section 403 indicates that if failures corresponding to the warning codes XX040008, XX100001, XX100002, XX100003, XX100004, XX010001, XX010002, XX010003, XX010004, XX310001, and XX040010 in hexadecimal notation have occurred, the image forming apparatus 102 notifies the management server 106.

A section 404 indicates jam codes to be monitored. The section 404 indicates that if failures corresponding to the jam codes starting with "04" in hexadecimal notation, "40030" in decimal notation, and 40900 to 40933 in decimal notation have occurred, the image forming apparatus 102 notifies the management server 106.

The list of failure codes to be monitored 401 includes the failure codes corresponding to the failures to be monitored which may occur while the image forming apparatus 102 is using the function employing the service provided by the function providing apparatus 108. Such failure codes correspond to previously known failure codes that have become monitoring objects, and new failure codes that have been newly added, as a result of addition of the function employing the service provided by the function providing apparatus 108.

FIG. 5 illustrates an example of a correspondence table 500 between the type of the list of failure codes to be monitored 401 illustrated in FIG. 4 and the function provided by the function providing apparatus 108. The management server 106 manages the correspondence table 500.

Referring to FIG. 5, a function code 501 indicates a code of the function which cooperates with the function providing apparatus 108. The functions include file management for storing a document scanned by the image forming apparatus 102, push-printing in which a document can be printed without using a printer driver, file editing, and so on.

A monitoring object code type 502 indicates a type of the list of failure codes to be monitored 401 illustrated in FIG. 4. The types includes type A corresponding to the file management function, type B corresponding to the push-printing function, and type C corresponding to the file editing function.

A list of the failure codes to be monitored by the image forming apparatus 102 with respect to the function provided by the function providing apparatus 108 is thus determined using the correspondence table 500 stored in the management server 106. According to the present exemplary embodiment, the failure codes to be monitored are managed with respect to a function type. However, the failure codes to be monitored may be managed with respect to each specific function.

The image forming apparatus 102 may become capable of newly using a function provided by the function providing apparatus 108 by upgrading of the firmware or addition of an application. In such a case, the management server 106 transmits, to the image forming apparatus 102, the list of failure codes to be monitored 401 of the type corresponding to the function that has become newly usable. The image forming apparatus 102 then uses the new list of failure codes to be monitored 401 to monitor a failure occurring in the newly usable function and notify the management server 106 of such a failure, which will be described in detail below.

According to the present exemplary embodiment, the tables managed by the management server 106 may be stored in the storing unit 202 in the management server 106 or in the external device including a storage that can be referred to by the management server 106. Further, there is no limitation on the format of the management table as long as the data can be similarly managed. For example, the management table according to the present exemplary embodiment may be divided into a plurality of tables. The list of failure codes to be monitored 401 illustrated in FIG. 4 may also be stored in the external device including a storage that can be referred to by the management server 106.

FIG. 6 illustrates an example of a failure information table 600 managed by the management server 106.

Referring to FIG. 6, a failure code 601 indicates a code for identifying the failure that occurs in the image forming apparatus. The image forming apparatus uses a notification including the failure code 601 to notify the management server 106 of the occurrence of an abnormality or a failure. In other words, the failure code described in the list of failure codes to be monitored 401 is also described in the failure code 601.

Details of failure 602 indicates the details of each failure. Further, a degree of importance may also be added to each failure code (not illustrated). The management server 106 refers to the failure information table 600 and identifies the type of failure. The management server 106 then issues the notification to arrange for dispatching of the service personnel according to the details and the degree of importance of the failure.

There are failure codes illustrated in the column of the failure code 601 including sub-codes indicated in parentheses, such as in 04010001(0000) and 0xx10001(0001). The sub-codes in the parentheses are added by the image forming apparatus 102. The sub-code (0000) indicates that the failure has occurred in the image forming apparatus 102, and the sub-code (0001) indicates that the failure has occurred in the function providing apparatus 108.

FIG. 7 illustrates an example of a notification address information table 700 managed by the management server 106.

Referring to FIG. 7, a column 701 indicates the name of the maintenance personnel belonging to the sales company of the image forming apparatus. The maintenance personnel indicates a service personnel that visits the customers and provides a maintenance service, or an operator taking calls. The information on the maintenance personnel is managed by being associated with the sales company information, the customer information and the device information managed by the management server 106, based on identification data (ID). The maintenance personnel provides the service to the customers associated therewith.

A column 702 indicates the information for notifying each maintenance personnel (i.e., e-mail addresses). E-mail addresses 703 indicate the notification address information of the maintenance personnel for the image forming apparatus 102. An e-mail address 704 indicates the notification address information of the maintenance personnel for the function providing apparatus 108.

According to the present exemplary embodiment, maintenance is to be performed on the image forming apparatus 102 and the function providing apparatus 108. The table 700 thus respectively stores the notification address information of the maintenance personnel for the image forming apparatus 102, i.e., the e-mail addresses 703, and the notification address information of the maintenance personnel for the function providing apparatus 108, i.e., thee-mail address 704. The notification address information of the maintenance personnel for the image forming apparatus 102 and for the function providing apparatus 108, i.e., the e-mail addresses 703 and 704, may each be stored and managed in separate tables.

According to the present exemplary embodiment, the management server 106 remotely manages the image forming apparatus 102, mainly via the network, to perform maintenance. Further, the management server 106 manages necessary information on the function providing apparatus 108 providing the functions to the image forming apparatus 102, so that the image forming apparatus 102 can be efficiently managed.

The management server 106 uses the e-mail addresses 703 in the table 700 and notifies the maintenance personnel of the failure information, for restoring the image forming apparatus 102 in which the failure has occurred. Further, the management server 106 uses the e-mail address 704 in the table 700 and notifies the maintenance personnel of the failure information, for restoring the function providing apparatus 108 in which the failure has occurred.

FIG. 8 illustrates an example of a correspondence table 800, which is managed by the management server 106, between the image forming apparatus 102 and the function provided by the function providing apparatus 108.

Referring to FIG. 8, a column 801 indicates the model information of the image forming apparatus 102. A row 802 indicates the functions provided by the function providing apparatus 108. The functions illustrated in FIG. 8 are as follows. A file management function acquires and stores a document that the image forming apparatus 102 has scanned. A network print function directly converts to a desired data format and transmits the document on the Internet to the image forming apparatus, and causes the image forming apparatus to print the converted document (i.e., push-printing in which the document can be printed without the printer driver). A work flow function provides a standard operation in which the data acquired by the image forming apparatus scanning a document is processed as desired, and the processed data is transmitted to the outside.

The management server 106 can thus identify, by using the correspondence table 800, a model of the image forming apparatus that can use the various functions provided by the function providing apparatus 108.

FIG. 9 illustrates an example of a correspondence table 900, which is managed by the management server 106, between the functions provided by the function providing apparatus 108 and version information of the firmware of the image forming apparatus 102 that can use such functions.

Referring to FIG. 9, a column 901 indicates the firmware information of the image forming apparatus 102. A row 902 indicates the functions provided by the function providing apparatus 108. The management server 106 can identify, by using the table 900, the version of the firmware in the image forming apparatus which is necessary for using the functions provided by the function providing apparatus 108.

Figure 10:
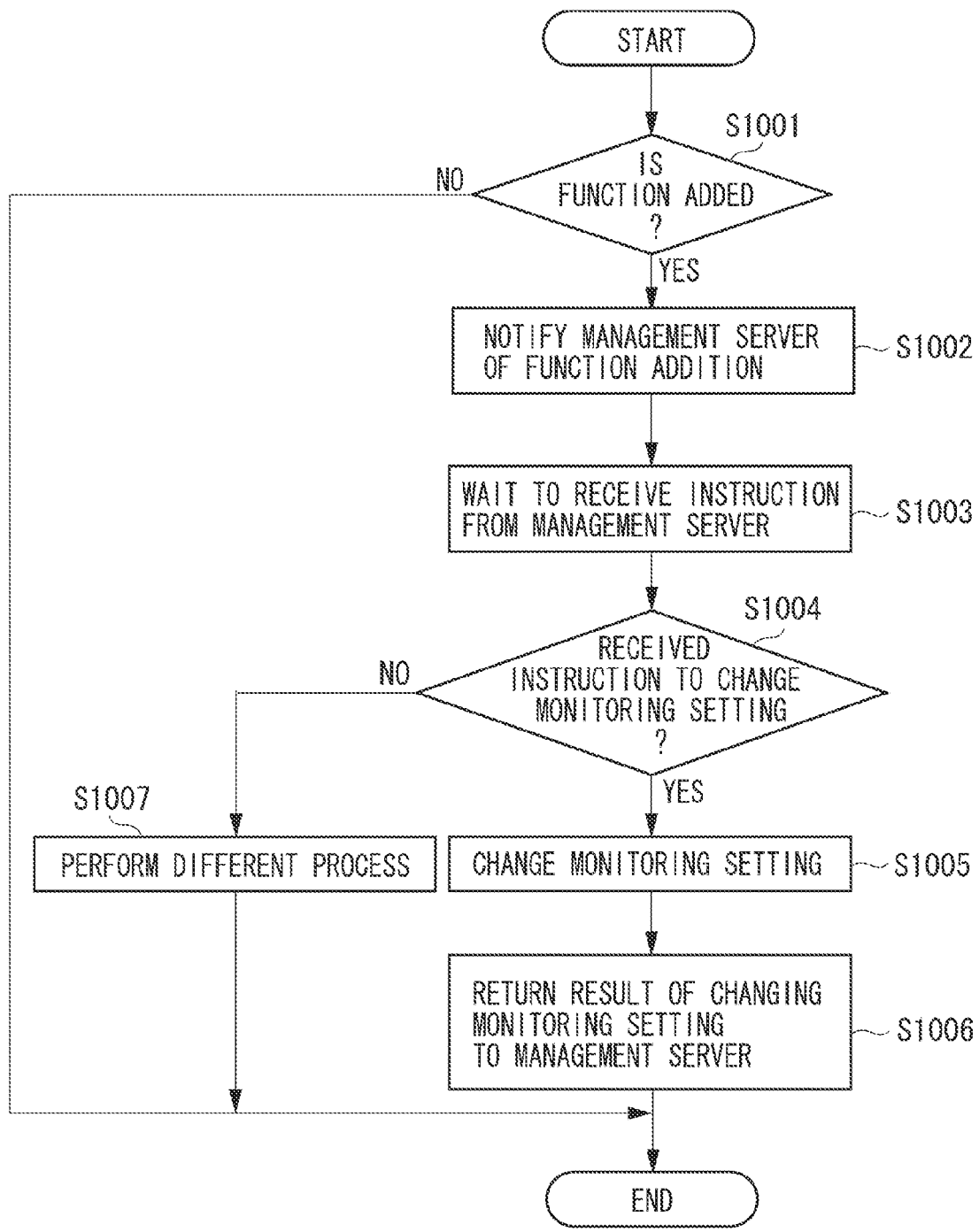
FIG. 10 is a flowchart illustrating an example of a process performed when a function which cooperates with the function providing apparatus is added to the image forming apparatus.

FIG. 10 is a flowchart illustrating an example of the process performed when a function which cooperates with the function providing apparatus 108 is added to the image forming apparatus 102. The process of the flowchart illustrated in FIG. 10 is performed by the function control unit 308 and the failure information control unit 307. More specifically, the process is realized by the CPU in the image forming apparatus 102 executing the program stored in the storing unit 302.

When the firmware in the image forming apparatus 102 has been upgraded or an application has been added to the image forming apparatus 102, the function control unit 308 starts the process illustrated in the flowchart.

In step S1001, the function control unit 308 determines whether the function which cooperates with the function providing apparatus 108 has been added to the image forming apparatus 102. If the function control unit 308 determines that the function which cooperates with the function providing apparatus 108 has not been added to the image forming apparatus 102 (NO in step S1001), the function control unit 308 ends the process illustrated in the flowchart.

On the other hand, if the function control unit 308 determines that the function which cooperates with the function providing apparatus 108 (i.e., the function using the service provided by the function providing apparatus 108) has been added (YES in step S1001), the process proceeds to step S1002.

In step S1002, the function control unit 308 notifies the management server 106 via the communication unit 301 of the addition of the function (i.e., performs a function addition transmission process). The content of the notification includes the information for identifying the added function (i.e., the function code 501 illustrated in FIG. 5 according to the present exemplary embodiment).

In step S1003, the function control unit 308 waits to receive an instruction from the management server 106 via the communication unit 301 (i.e., performs a monitoring condition receiving process). When the function control unit 308 receives the instruction returned from the management server 106 in response to the function addition notification, the process proceeds to step S1004.

In step S1004, the function control unit 308 determines whether the instruction from the management server 106 is an instruction to change a monitoring setting. If the function control unit 308 determines that the instruction from the management server 106 is an instruction to change the monitoring setting (YES in step S1004), the process proceeds to step S1005.

In step S1005, the function control unit 308 instructs the failure information control unit 307 to change the monitoring setting. As a result, the failure information control unit 307 changes the monitoring setting, which will be described in detail below. The instruction to change the monitoring setting received from the management server 106 includes the list of failure codes to be monitored 401 (illustrated in FIG. 4) corresponding to the monitoring object code type 502 of the added function. The failure information control unit 307 stores the list of failure codes to be monitored 401 in the storing unit 302 and changes the monitoring setting thereof, so that the failures are monitored according to the stored list of failure codes to be monitored 401.

In step S1006, the failure information control unit 307 transmits to the management server 106 the result of changing the monitoring setting, and the process ends.

If the function control unit 308 determines that the instruction from the management server 106 is not an instruction to change the monitoring setting (NO in step S1004), the process proceeds to step S1007.

In step S1007, the function control unit 308 performs the process (i.e., a different process) instructed from the management server 106, and the process ends. The different process indicates changing a schedule of transmitting the information, or restarting.

FIG. 10 illustrates a process in which, if the function employing the service provided by the function providing apparatus 108 has been added to the image forming apparatus 102, the image forming apparatus 102 notifies the management server 106 of the addition of the function. The image forming apparatus 102 then receives from the management server 106 the instruction to change the monitoring setting. However, the image forming apparatus 102 may notify of the addition of the function and receive the instruction to change the monitoring setting from the management server 106 even in a case where a function is added thereto (i.e., the function is not limited to the functions employing the service provided by the function providing apparatus 108).

Figure 11:
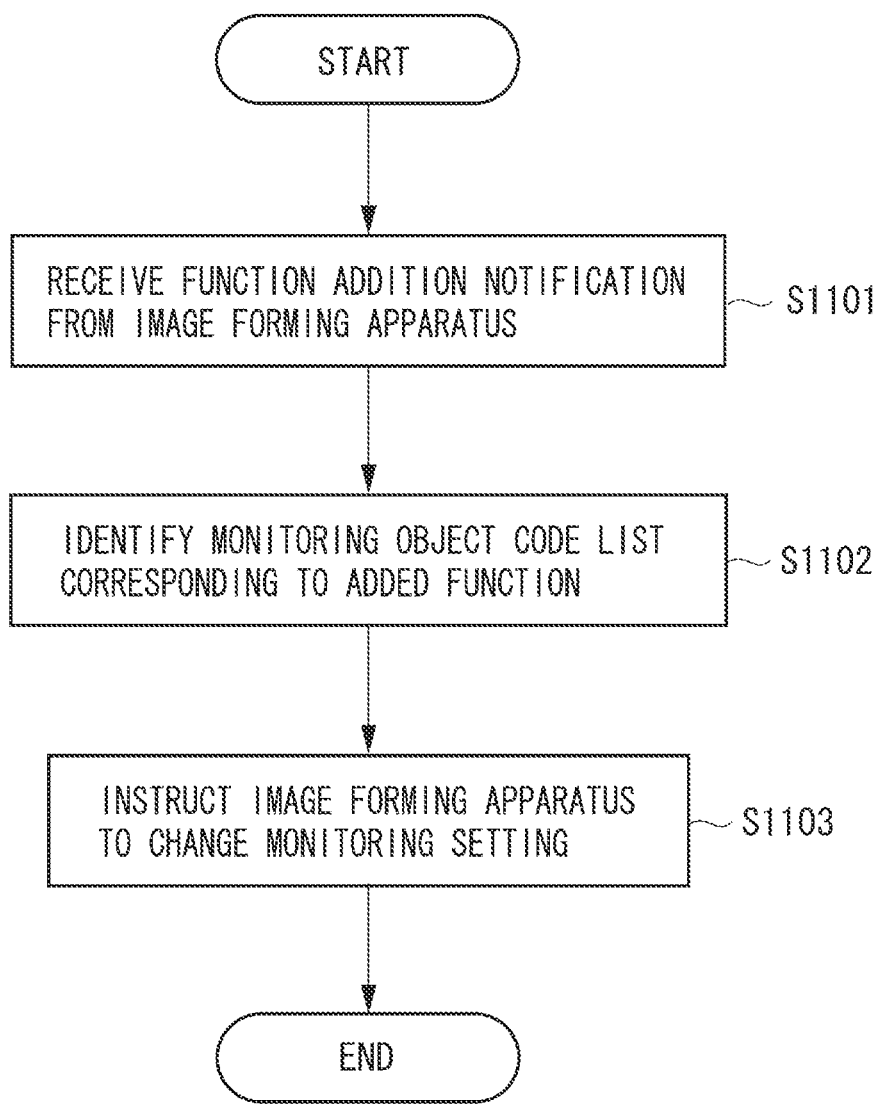
FIG. 11 is a flowchart illustrating a process performed when the management server has received a function addition notification from the image forming apparatus.

FIG. 11 is an example of a flowchart illustrating a process performed when the management server 106 has received the function addition notification from the image forming apparatus 102.

The process of the flowchart is performed by the control unit 203 in the management server 106. In other words, the process is realized by the CPU in the management server 106 executing the program stored in the storing unit 202.

In step S1101, the control unit 203 in the management server 106 receives the function addition notification from the image forming apparatus 102 (i.e., performs a function addition receiving process: refer to step S1002 illustrated in FIG. 10). The process then proceeds to step S1102.

In step S1102, the control unit 203 identifies, by using the function code 501 included in the function addition notification received in step S1101, the function added to the image forming apparatus 102 and the monitoring object code type 502. The control unit 203 then identifies the list of failure codes to be monitored 401 using the monitoring object code type 502. For example, if the function code 501 included in the function addition notification received from the image forming apparatus 102 is "0001", the control unit 203 identifies the monitoring object code type 502 as "A", and identifies the list of failure codes to be monitored 401 corresponding to "A".

In step S1103, the control unit 203 transmits to the image forming apparatus 102 an instruction to change the monitoring setting including the list of failure codes to be monitored 401 identified in step S1102 (i.e., performs a monitoring condition transmission process). The image forming apparatus 102 receives the instruction to change the monitoring setting, and the monitoring setting of the image forming apparatus 102 is thus changed (refer to step S1004 to step S1006 illustrated in FIG. 10).

Figure 12:
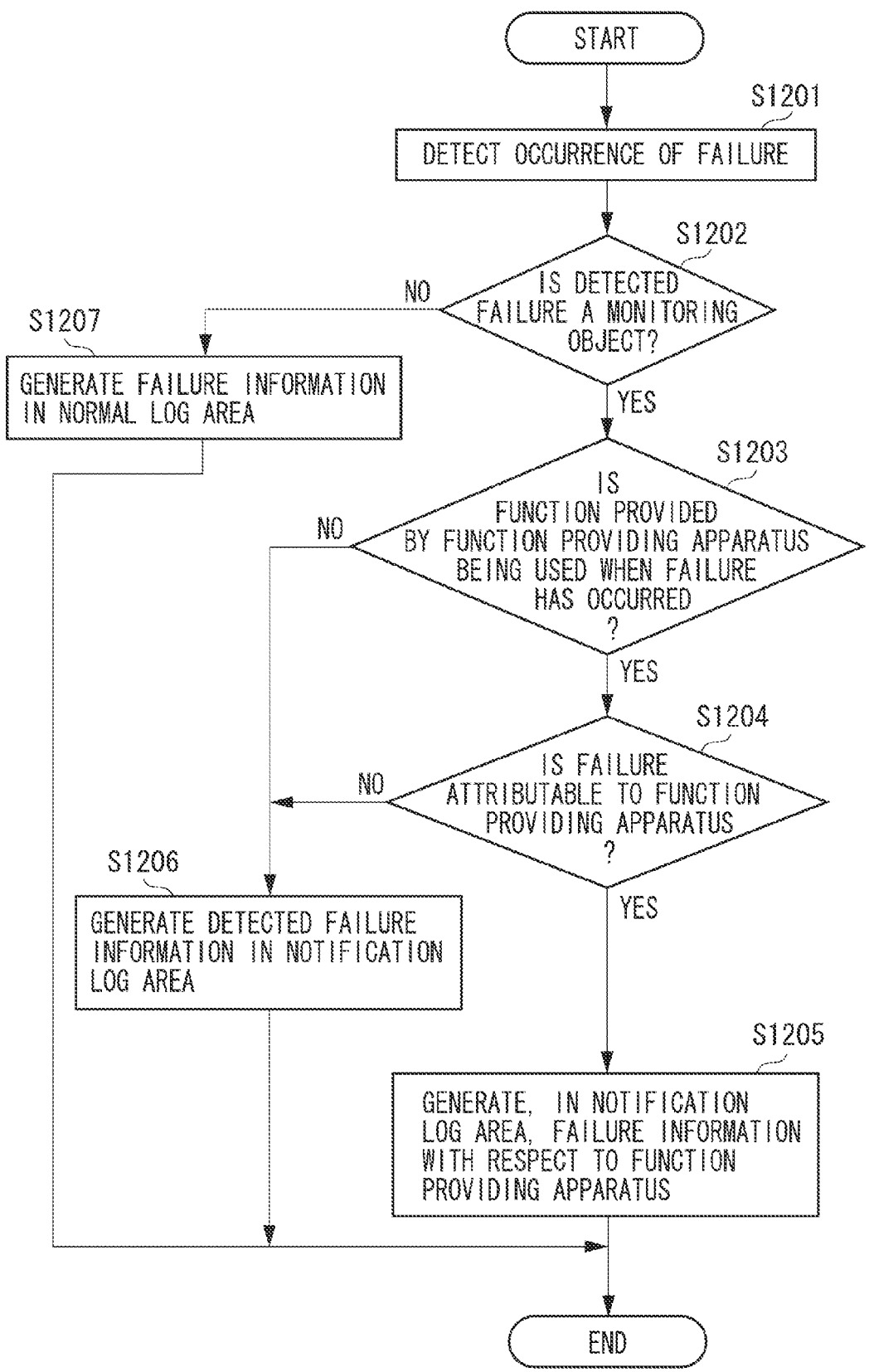
FIG. 12 is a flowchart illustrating an example of a process performed when a failure has occurred in the image forming apparatus.

FIG. 12 is an example of a flowchart illustrating a process performed when a failure occurs in the image forming apparatus 102.

The process of the flowchart illustrated in FIG. 12 is performed by the failure information control unit 307 and the function control unit 308. More specifically, the process is realized by the CPU in the image forming apparatus 102 executing the program stored in the storing unit 302.

In step S1201, the failure information control unit 307 monitors an occurrence of the failure. When the failure information control unit 307 detects that the failure has occurred, the process proceeds to step S1202.

In step S1202, the failure information control unit 307 determines whether the failure which has occurred is a monitoring object. In other words, the failure information control unit 307 determines whether the failure corresponds to the monitoring setting previously set to the failure information control unit 307, or the monitoring setting changed in step S1005 illustrated in FIG. 10 (i.e., the contents of the list of failure codes to be monitored 401).

If the failure information control unit 307 determines that the failure which has occurred is not a monitoring object (NO in step S1202), the process proceeds to step S1207. In step S1207, the failure information control unit 307 generates in a normal log area the failure information on the failure that has occurred. The normal log area is an area managed by the failure information control unit 307 for generating and storing the failure information on which immediate notification to the management server 106 is not necessary (i.e., not a monitoring object).

On the other hand, if the failure information control unit 307 determines that the failure which has occurred is a monitoring object (YES in step S1202), the process proceeds to step S1203.

In step S1203, the failure information control unit 307 determines whether the function control unit 308 has been using, when the failure has occurred, the function provided by the function providing apparatus 108 (i.e., whether the function control unit 308 has been performing the function which cooperates with the function providing apparatus 108).

If the failure information control unit 307 determines that the function control unit 308 has not been using the function provided by the function providing apparatus 108 (NO in step S1203), the process proceeds to step S1206.

In step S1206, the failure information control unit 307 generates in a notification log area the failure information on the failure that has occurred. The generated failure information includes the failure code indicating the details of the failure that has occurred in the image forming apparatus 102. Further, if the failure has occurred in the image forming apparatus 102 while using the function provided by the function providing apparatus 108, and if it is necessary to restore the image forming apparatus 102, the information indicating such a case (e.g., the sub-code (0000) illustrated in FIG. 6) may be included in the failure information.

If the failure information control unit 307 determines that the function control unit 308 has been using the function provided by the function providing apparatus 108 (YES in step S1203), the process proceeds to step S1204.

In step S1204, the failure information control unit 307 determines whether the occurrence of the failure is attributable to the function providing apparatus 108, based on the details of the failure. For example, if the function being used in the image forming apparatus 102 has ended due to an error, and if the function providing apparatus 108 has blocked the communication, then the failure information control unit 307 determines that the failure is attributable to the function providing apparatus 108.

Further, it is assumed that when the network print function is used, there is an abnormality in the format or the content of the print data transmitted from the function providing apparatus 108. More specifically, there is an abnormality in the content described in PDL. In such a case, the image forming apparatus 102 maybe "unable to interpret PDL" when performing rendering. The failure information control unit 307 thus determines that the occurrence of the failure is attributable to the function providing apparatus 108.

If the failure information control unit 307 determines that the occurrence of the failure is attributable to the function providing apparatus 108 (YES in step S1204), the process proceeds to step S1205.

In step S1205, the failure information control unit 307 generates, in the notification log area, the failure information by which it can be identified that the occurrence of the failure is attributable to the function providing apparatus 108. For example, in the case of the above-described PDL error, the failure information including a previously prepared failure code (x2003) indicating the rendering error (i.e., there is abnormality in the acquired PDL) is generated. The function code and an identifier by which it can be identified that the occurrence of the failure is attributable to the function providing apparatus 108 (e.g., the sub-code (0001) illustrated in FIG. 6) may also be included in the failure information.

Further, if the image forming apparatus 102 receives, from the function providing apparatus 108, information indicating the abnormality occurring in the function providing apparatus 108 (e.g., the failure code of the function providing apparatus 108), the information maybe included in the failure information. The notification log area is an area in which the failure information to be notified to the management server 106 is generated and stored, and is managed by the failure information control unit 307. Further, the notification log area and the normal log area are both included in the storing unit 302 in the image forming apparatus 102.

If it is clear from the details of the failure that the failure has occurred inside the image forming apparatus (e.g., a jam), the failure information control unit 307 determines that the occurrence of the failure cannot be determined to be attributable to the function providing apparatus 108. Further, if it is unclear from the details of the failure that the failure has occurred in the function providing apparatus 108, the failure information control unit 307 determines that the occurrence of the failure cannot be determined to be attributable to the function providing apparatus 108. In such cases (NO in step S1204), the process proceeds to step S1206.

In step S1206, the failure information control unit 307 generates, in the notification log area, the failure information on the failure that has occurred. The failure information to be generated includes, if it is clear that the failure has occurred inside the image forming apparatus (e.g., a jam), the failure code indicating the content of the failure that has occurred in the image forming apparatus 102.

In such a case, the information indicating that the error has occurred in the image forming apparatus 102 (e.g., the sub-code (0000) illustrated in FIG. 6) may be included in the failure information. If it is unclear that the failure has occurred in the function providing apparatus 108, the failure information generated in step S1206 includes the failure code indicating the error whose occurrence is detected in step S1201 (e.g., a communication error or an abnormal end). Further, the failure information may include the function code, and the information indicating that the failure has occurred while using the function provided by the function providing apparatus 108.

Figure 13:
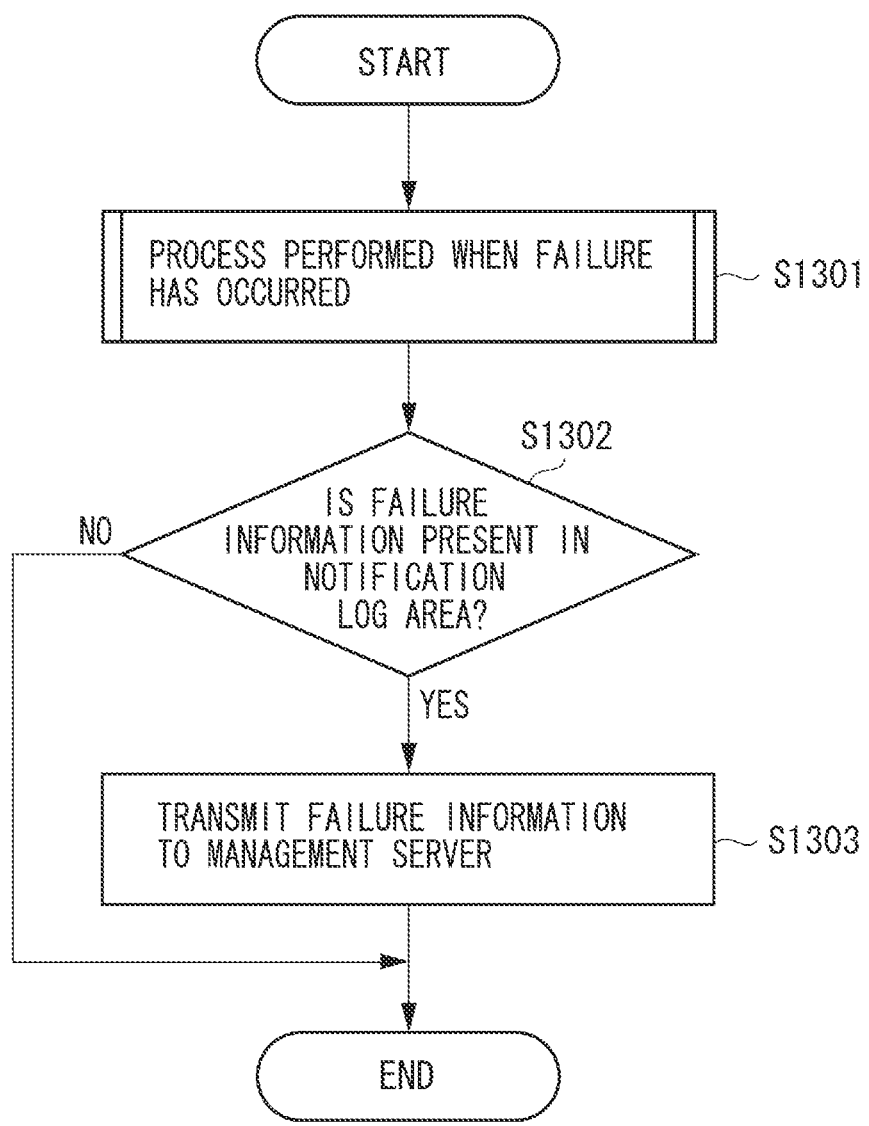
FIG. 13 is a flowchart illustrating an example of a process performed by the image forming apparatus when transmitting the failure information to the management server.

FIG. 13 is a flowchart illustrating an example of a process in which the image forming apparatus 102 transmits the failure information to the management server 106.

The process illustrated in the flowchart of FIG. 13 is performed by the device information control unit 304. In other words, the flowchart is realized by the CPU in the image forming apparatus 102 executing the program stored in the storing unit 302.

In step S1301, the device information control unit 304 causes the failure information control unit 307 to perform the process to be performed when a failure occurs (refer to the process illustrated in FIG. 12).

In step S1302, the device information control unit 304 determines whether the failure information is present in the notification log area. If the device information control unit 304 determines that the failure information is present in the notification log area (YES in step S1302), the process proceeds to step S1303.

In step S1303, the device information control unit 304 transmits the failure information present in the notification log area to the management server 106 via the communication unit 301, and the process ends. The device information control unit 304 transmits the failure information along with the identification information of the image forming apparatus (e.g., the IP address and the model information).

If the device information control unit 304 determines that the failure information is not present in the notification log area (NO in step S1302), the process ends.

Figure 14:
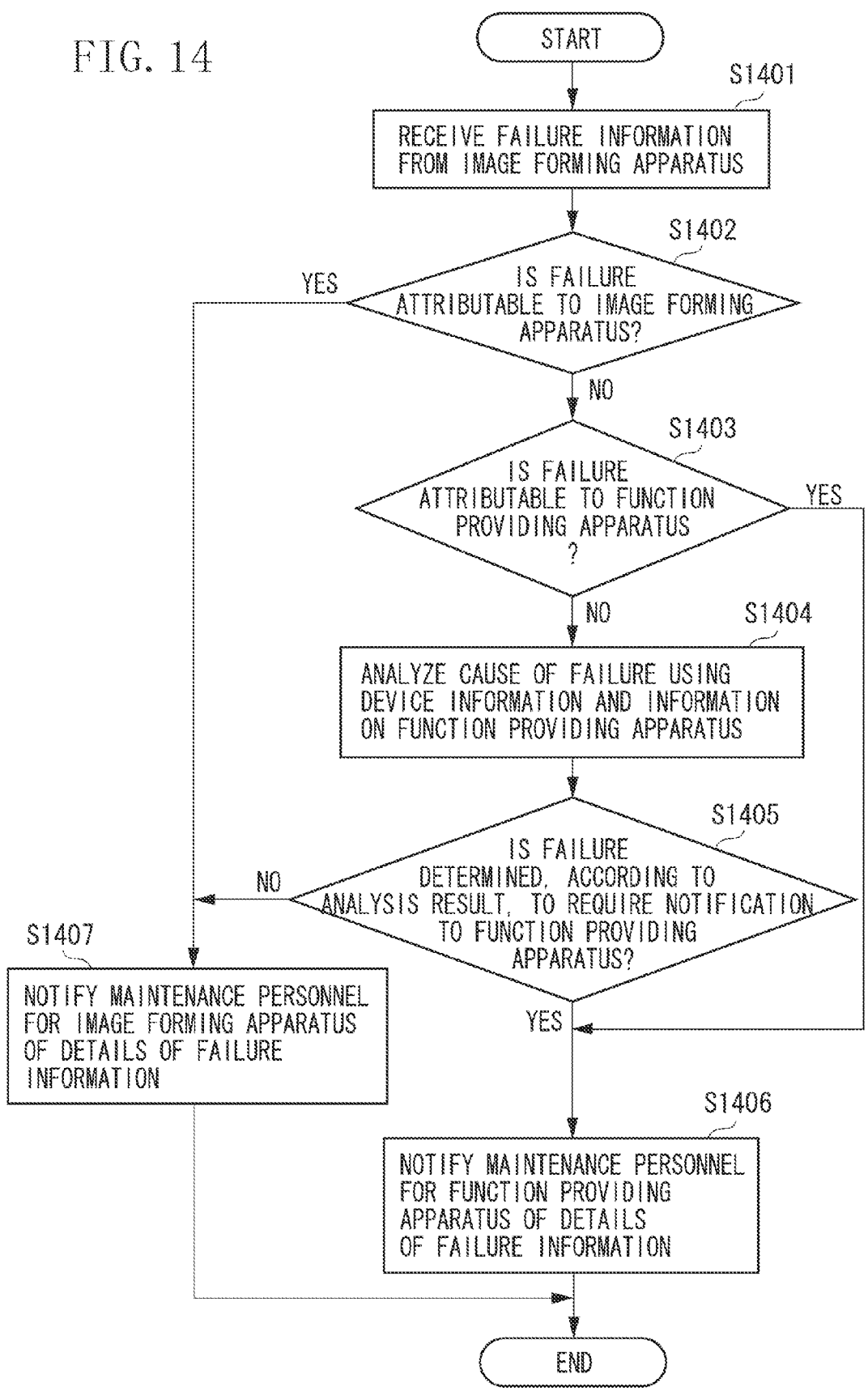
FIG. 14 is a flowchart illustrating an example of a process performed when the management server has received the notification according to the cause of failure.

FIG. 14 is a flowchart illustrating an example of a process performed when the management server 106 receives a notification according to the cause of failure.

The control unit 203 in the management server 106 performs the process illustrated in the flowchart of FIG. 14. In other words, the process is realized by the CPU in the management server 106 executing the program stored in the storing unit 202.

In step S1401, upon receiving the failure information from the image forming apparatus 102 (refer to step S1303 illustrated in FIG. 13), the notification management unit 204 in the control unit 203 of the managements server 106 performs control to store the failure information in the storing unit 202. The failure information is stored in the storing unit 202 associated with the identification information of the image forming apparatus (e.g., the IP address and the model information)

received along therewith. The device management unit 206 then manages the stored failure information.

In step S1402, the notification management unit 204 refers to the failure information table 600 illustrated in FIG. 6. The notification management unit 204 then determines whether the failure is attributable to the image forming apparatus 102, based on the failure code included in the received failure information. If the failure information includes the identifier by which it can be determined that the occurrence of the failure is attributable to the image forming apparatus 102 (e.g., the sub-code (0000) illustrated in FIG. 6), the determination may be performed based on the identifier.

If the notification management unit 204 determines that the failure is attributable to the image forming apparatus 102 (YES in step S1402), the process proceeds to step S1407.

In step S1407, the notification management unit 204 notifies the address of the maintenance personnel for the image forming apparatus 102 via the communication unit 201, of the details of the failure information received in step S1401. The process then ends. The address of the maintenance personnel is determined by referring to the address in the column 702 of the notification address information table 700 illustrated in FIG. 7.

On the other hand, if the notification management unit 204 does not determine that the failure is attributable to the image forming apparatus 102 (NO in step S1402), the process proceeds to step S1403.

In step S1403, the notification management unit 204 refers to the failure information table 600 illustrated in FIG. 6 and determines whether the received failure information is based on the failure attributable to the function providing apparatus 108. If the failure information includes the identifier by which it can be determined that the occurrence of the failure is attributable to the function providing apparatus 108 (e.g., the sub-code (0001) illustrated in FIG. 6), the determination may be performed based on the identifier.

If the notification management unit 204 determines that the received failure information is based on the failure attributable to the function providing apparatus 108 (YES in step S1403), i.e., the failure information has been generated in step S1205 illustrated in FIG. 12, the process proceeds to step S1406.

On the other hand, if the notification management unit 204 does not determine that the received failure information is based on the failure attributable to the function providing apparatus 108 (NO in step S1403), i.e., the failure information has been generated in step S1206 illustrated in FIG. 12, the process proceeds to step S1404.

In step S1404, the notification management unit 204 analyzes the cause of the failure using the device information and the information on the function providing apparatus 108. More specifically, the notification management unit 204 uses the correspondence tables 800 and 900 respectively illustrated in FIGS. 8 and 9. The notification management unit 204 then confirms whether the model of the image forming apparatus 102 which has transmitted the failure information is capable of using the functions provided by the function providing apparatus 108. The notification management unit 204 may also confirm whether the version of the firmware in the image forming apparatus 102 is of the appropriate level for using the functions.

The device information management unit 206 manages the IP address, the MAC address, the model information, and the firmware version information of the image forming apparatus. The model information and the firmware version information of the image forming apparatus 102 that has transmitted the failure information can be acquired using the IP address added to the failure information.

For example, the failure information received in step S1401 may include the information indicating that the failure has occurred while using the function providing apparatus 108. Further, it may be confirmed that the image forming apparatus 102 is capable of using the function providing apparatus 108 based on the model and the firmware version thereof. In such a case, the notification management unit 204 analyzes in step S1404 that it is necessary to contact the maintenance personnel for the function providing apparatus 108.

In step S1405, the notification management unit 204 determines, based on the analysis result of step S1404, whether the failure requires a notification to the maintenance personnel for the function providing apparatus 108. If the notification management unit 204 determines that the failure requires a notification to the maintenance personnel for the function providing apparatus 108 (YES in step S1405), the process proceeds to step S1406.

In step S1406, the notification management unit 204 notifies via the communication unit 201 the address of the maintenance personnel for the function providing apparatus 108, of the details of the failure information received in step S1401. The process then ends. The address of the maintenance personnel for the function providing apparatus 108 is determined by referring to the e-mail address 704 in the column 702 of the notification address information table 700 illustrated in FIG. 7.

If the notification management unit 204 cannot determine that the failure requires a notification to the maintenance personnel for the function providing apparatus 108 (NO in step S1405), the process proceeds to step S1407. Instep S1407, the notification management unit 204 notifies the address of the maintenance personnel for the image forming apparatus 102 via the communication unit 201, of the details of the failure information received in step S1401. The process then ends. The maintenance personnel for the image forming apparatus 102 who is dispatched to the installation side can confirm the cause of the failure even when the failure is attributable to the function providing apparatus 108. The recovery operation is thus appropriately performed.

As described above, according to the present exemplary embodiment, the management system determines whether the occurrence of a failure is attributable to the image forming apparatus 102 even when a new function is added to the image forming apparatus 102. The management server 106 can then change the address to be notified of the failure information. The sales company thus becomes capable of dispatching the appropriate service personnel.

The image forming apparatus can thus appropriately notify the management server 106, the management server 106 can identify where the failure has occurred, and the appropriate service personnel can be dispatched, even if a function which cooperates with the function on the network is newly added to the image forming apparatus 102. As a result of providing such a flexible system, it becomes unnecessary for the user to become aware of where the failure has occurred and the user can continue to receive the maintenance service for the image forming apparatus.

According to the present exemplary embodiment, the image forming apparatus 102 notifies the management server 106 of the function added thereto. The management server 106 then instructs the image forming apparatus 102 to change the monitoring setting according to the received notification. However, the management server 106 may regularly check the image forming apparatus 102, detect addition of functions, and request the image forming apparatus 102 to change the monitoring setting.

Further, the configuration and the content of the various data are not limited to the above, and may be of different configuration and content according to the use and the objective.

The present invention may be embodied as a system, an apparatus, a method, a program, or a storage medium. More specifically, the present invention may be applied to a system including a plurality of devices, or to an apparatus including a single device. Further, a configuration which combines the above-described exemplary embodiments is within the scope of the present invention.

Moreover, the present invention may be realized by supplying, via a network or various storage media, software (a program) which implements the functions of the above-described exemplary embodiment to a system or an apparatus, and a computer (or a CPU or a micro-processor unit (MPU)) of the system or the apparatus reading and executing the program.

Further, the present invention may be applied to a system including a plurality of devices or an apparatus including a single device.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-005633 filed Jan. 14, 2011, which is hereby incorporated by reference herein in its entirety.

What is claimed is:

1. A management system including an image forming apparatus and a management server that communicates with the image forming apparatus via a network, the image forming apparatus comprising:
    a monitoring unit configured to monitor a failure;
    a detection unit configured to detect addition of a function that uses a service provided by a function providing apparatus, which is different from the management server, by communicating with the function providing apparatus via the network, wherein the function is added to the image forming apparatus according to upgrading of firmware of the image forming apparatus or addition of an application to the image forming apparatus;
    an added function transmission unit configured to transmit, in response to the addition of the function detected by the detection unit, to the management server information on the added function;
    a monitoring condition receiving unit configured to receive a monitoring condition, corresponding to the added function, returned from the management server;
    a setting unit configured to set the monitoring condition received by the monitoring condition receiving unit to be added to a monitoring condition of the monitoring unit;
    a result receiving unit configured to receive a processing result of the service used by the added function from the function providing apparatus;
    a generation unit configured to generate, when the monitoring unit has detected an occurrence of a failure corresponding to the monitoring condition and the failure is attributable to the function providing apparatus, failure information by which it is identified that the detected failure is attributable to the function providing apparatus, and to generate, when it is not identified that the failure is attributable to the function providing apparatus, failure information on the failure detected by the monitoring unit; and
    a transmission unit configured to transmit to the management server the failure information generated by the generation unit, wherein the generation unit generates, as failure information by which it is identified that the detected failure is attributable to the function providing apparatus, failure information including a failure code having been notified by the function providing apparatus when the added function is used, and
the management server comprising:
    an added function receiving unit configured to receive information on the added function from the image forming apparatus;
    a monitoring condition transmission unit configured to transmit to the image forming apparatus a monitoring condition corresponding to the information on the added function received by the added function receiving unit;
    a receiving unit configured to receive failure information from the image forming apparatus; and
    a notification unit configured to issue a notification for arranging maintenance of the image forming apparatus according to the failure information received from the image forming apparatus,
    wherein the management server identifies that the failure is attributable to the function providing apparatus based on the received failure information.

2. A management server which manages an image forming apparatus capable of communicating with a function providing apparatus via a network, the management server comprising:
    a monitoring condition transmission unit configured to transmit to the image forming apparatus a monitoring condition corresponding to information on a function of the image forming apparatus;
    a receiving unit configured to receive failure information from the image forming apparatus;
    an identification unit configured to identify, based on the failure information received from the image forming apparatus, whether a failure corresponding to the received failure information is attributable to the image forming apparatus or to the function providing apparatus; and
    a notification unit configured to issue a notification for arranging maintenance of the image forming apparatus according to the received failure information when the identification unit identifies that the failure is attributable to the image forming apparatus,
    wherein the management server does not perform, when the identification unit identifies that the failure is attributable to the function providing apparatus based on that the received failure information includes a failure code indicating a failure occurring in the function providing apparatus or a failure code having been notified by the function providing apparatus to the image forming apparatus, arrangement for maintenance of the image forming apparatus.

3. The management server according to claim 2, wherein the monitoring condition corresponding to the information on the function includes a failure code corresponding to a failure to be monitored which occurs while using the function.

4. The management server according to claim 3, wherein the failure code includes, due to an addition of the function to the image forming apparatus, a previously known failure code which is to be monitored, or a new failure code which has been newly added.

5. The management server according to claim 2, wherein the identification unit analyzes whether the function is used by the image forming apparatus based on device information including information regarding at least one of a model and firmware of the image forming apparatus, and identifies, when it is analyzed that the image forming apparatus uses the function, that the failure is attributable to the function providing apparatus.

6. The management server according to claim 2, further comprising a management unit configured to manage an address of a personnel in charge of maintenance of the function providing apparatus,
wherein the notification unit notifies, when it is identified that the failure is attributable to the function providing apparatus based on the received failure information, the address of the personnel in charge of maintenance of the function providing apparatus managed by the management unit of an occurrence of the failure, without the management server arranging for maintenance of the image forming apparatus.

7. The management server according to claim 2, further comprising an added function receiving unit configured to receive, when a function using a service provided by the function providing apparatus by communicating with the function providing apparatus via the network is added to the image forming apparatus, information on the added function transmitted from the image forming apparatus, wherein the monitoring condition transmission unit is configured to transmit to the image forming apparatus a monitoring condition corresponding to the information on the added function received by the added function receiving unit.

8. An image forming apparatus which communicates with a management server via a network, the image forming apparatus comprising:
a monitoring unit configured to monitor a failure;
a detection unit configured to detect addition of a function that uses a service provided by a function providing apparatus, which is different from the management server, by communicating with the function providing apparatus via the network;
an added function transmission unit configured to transmit, in response to the addition of the function detected by the detection unit, to the management server information on the added function;
a monitoring condition receiving unit configured to receive a monitoring condition, corresponding to the added function, returned from the management server;
a setting unit configured to set the monitoring condition received by the monitoring condition receiving unit to be added to a monitoring condition of the monitoring unit;
a result receiving unit configured to receive a processing result of the service used by the added function from the function providing apparatus;
a generation unit configured to generate, when the monitoring unit has detected an occurrence of a failure corresponding to the monitoring condition and the failure is attributable to the function providing apparatus, failure information by which it is identified that the detected failure is attributable to the function providing apparatus, and to generate, when it is not identified that the failure is attributable to the function providing apparatus, failure information on the failure detected by the monitoring unit; and
a transmission unit configured to transmit to the management server the failure information generated by the generation unit,
wherein the generation unit generates, as failure information by which it is identified that the detected failure is attributable to the function providing apparatus, failure information including a failure code having been notified by the function providing apparatus when the added function is used.

9. The image forming apparatus according to claim 8, wherein the monitoring condition corresponding to the information on the added function includes a failure code corresponding to a failure to be monitored which occurs while using the function.

10. The image forming apparatus according to claim 9, wherein the failure code includes, due to the addition of the function, a previously known failure code which is to be monitored, or a new failure code which has been newly added.

11. The image forming apparatus according to claim 8, wherein the function is added to the image forming apparatus according to upgrading of firmware of the image forming apparatus or addition of an application to the image forming apparatus.

12. A management method performed by a management server which manages an image forming apparatus capable of communicating with a function providing apparatus via a network, the method comprising:
transmitting to the image forming apparatus a monitoring condition corresponding to information on a function of the image forming apparatus;
receiving failure information from the image forming apparatus;
identifying, based on the failure information received from the image forming apparatus, whether a failure corresponding to the received failure information is attributable to the image forming apparatus or to the function providing apparatus; and
issuing a notification for arranging maintenance of the image forming apparatus according to the received failure information when the identification unit identifies that the failure is attributable to the image forming apparatus,
wherein the management server does not perform, when the identifying step identifies that the failure is attributable to the function providing apparatus based on that the received failure information includes a failure code indicating a failure occurring in the function providing apparatus or a failure code having been notified by the function providing apparatus to the image forming apparatus, arrangement for maintenance of the image forming apparatus.

13. A method performed by an image forming apparatus that communicates with a management server via a network, the method comprising:
monitoring a failure;
detecting addition of a function that uses a service provided by a function providing apparatus, which is different from the management server, by communicating with a function providing apparatus via the network, wherein the function is added to the image forming apparatus according to upgrading of firmware of the image forming apparatus or addition of an application to the image forming apparatus;
transmitting, in response to the addition of the function detected by the detection unit, to the management server information on the detected added function;
receiving a monitoring condition corresponding to the added function returned from the management server;
setting the received monitoring condition to be added to the monitoring condition;

receiving a processing result of the service used by the added function from the function providing apparatus;

generating, when an occurrence of a failure corresponding to the monitoring condition is detected and the failure is attributable to the function providing apparatus, failure information by which it is identified that the detected failure is attributable to the function providing apparatus, and generating, when it is not identified that the failure is attributable to the function providing apparatus, failure information on the detected failure; and transmitting to the management server the generated failure information, wherein the generation unit generates, as failure information by which it is identified that the detected failure is attributable to the function providing apparatus, failure information including a failure code having been notified by the function providing apparatus when the added function is used.

14. A non-transitory computer-readable storage medium storing a program that causes a computer to execute a method for an image forming apparatus communicating with a management server via a network, the method comprising:

monitoring a failure;

detecting addition of a function that uses a service provided by a function providing apparatus, which is different from the management server, by communicating with a function providing apparatus via the network, wherein the function is added to the image forming apparatus according to upgrading of firmware of the image forming apparatus or addition of an application to the image forming apparatus;

transmitting, in response to the addition of the function detected by the detection unit, to the management server information on the detected added function;

receiving a monitoring condition corresponding to the added function returned from the management server according to the information transmitted;

setting the received monitoring condition to be added to the monitoring condition;

receiving a processing result of the service used by the added function from the function providing apparatus;

generating, when an occurrence of a failure corresponding to the monitoring condition is detected and the failure is attributable to the function providing apparatus, failure information by which it is identified that the detected failure is attributable to the function providing apparatus, and generating, when it is not identified that the failure is attributable to the function providing apparatus, failure information on the detected failure; and transmitting to the management server the generated failure information, wherein the generation unit generates, as failure information by which it is identified that the detected failure is attributable to the function providing apparatus, failure information including a failure code having been notified by the function providing apparatus when the added function is used.

* * * * *